United States Patent
Lau et al.

(10) Patent No.: US 8,621,026 B2
(45) Date of Patent: Dec. 31, 2013

(54) BATCHING NOTIFICATIONS TO OPTIMIZE FOR BATTERY LIFE

(75) Inventors: William Lau, Bellevue, WA (US); Ravikant Cherukuri, Snoqualmie, WA (US); Yossi Firstenberg, Redmond, WA (US); Darren Louie, Bellevue, WA (US); Gaurav Anand, Seattle, WA (US); Kevin Michael Woley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 74 days.

(21) Appl. No.: 13/229,724

(22) Filed: Sep. 11, 2011

(65) Prior Publication Data

US 2013/0067014 A1    Mar. 14, 2013

(51) Int. Cl.
*G06F 15/16* (2006.01)

(52) U.S. Cl.
USPC .............. 709/207; 700/291; 702/60; 713/340

(58) Field of Classification Search
USPC ............ 709/200–203, 217–227, 228; 702/60; 700/291; 713/340
See application file for complete search history.

(56) References Cited

U.S. PATENT DOCUMENTS

| | | | |
|---|---|---|---|
| 7,881,322 B1 | 2/2011 | Benveniste | |
| 2005/0255833 A1 | 11/2005 | Bar-Or | |
| 2010/0083255 A1 | 4/2010 | Bane et al. | |
| 2011/0096709 A1 | 4/2011 | Jeyaseelan | |
| 2011/0296213 A1* | 12/2011 | Ferlitsch et al. | 713/320 |

OTHER PUBLICATIONS

Naldi et al., "Batch Delivery in Wireless Sensor Networks", In Proc. European Wireless Conference, Retrieved at <<http://www.tkn.tu-berlin.de/publications/papers/NaldiWillig08.pdf>>, Jun. 2008, pp. 7.
"Push Notifications for Windows Phone Development", Retrieved at <<http://create.msdn.com/en-US/education/quickstarts/push_notifications>>, Retrieved Date: May 30, 2011, pp. 11.
The State and Notifications Broker API Part 2, Retrieved at <<http://msdn.microsoft.com/en-us/library/bb286907.aspx#BatchNotifications>>, Retrieved Date: May 30, 2011, pp. 19.
Rohl et al., "A Short Look on Power Saving Mechanisms in the Wireless LAN Standard Draft IEEE 802.11", 6th WINLAB Workshop on Third Generation Wireless Systems, Retrieved at <<http://citeseerx.ist.psu.edu/viewdoc/download?doi=10.1.1.22.7434&rep=rep1&type=pdf>>, Retrieved Date: May 30, 2011, pp. 6.

* cited by examiner

*Primary Examiner* — Moustafa M Meky

(57) ABSTRACT

In one embodiment, a notification server 110 may batch together notifications to reduce power consumption. A notification server 110 may receive a power consumption profile 430 from a client device 120. The notification server 110 may assign a notification batch schedule at a notification server 110 based on the power consumption profile 430.

20 Claims, 7 Drawing Sheets

Figure 3
*300*

| DEVICE ID 310 | APP ID 320 | MESSAGE 330 | PRIORITY 340 |

Figure 4
*400*

| SERVER ID 410 | CLIENT ID 420 | POWER CONSUMPTION PROFILE 430 |

500

*600*

*700*

BATCHING NOTIFICATIONS TO OPTIMIZE FOR BATTERY LIFE

BACKGROUND

A device may occasionally be updated by receiving a notification from a notification server. The notification may be an upgrade to an application, an operating system, or firmware, such as a security patch or a new feature. Additionally, if the application is a messaging program, such as an e-mail application or an instant messaging program, the notifications may be an e-mail message. The notification server may send these notifications upon availability.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a notification server batching together notifications to reduce power consumption. A notification server may receive a power consumption profile from a client device. The notification server may assign a notification batch schedule at a notification server based on the power consumption profile.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 illustrates, in a block diagram, one embodiment of a notification.

FIG. 4 illustrates, in a block diagram, one embodiment of a profile protocol command.

DETAILED DESCRIPTION

Figure 1:
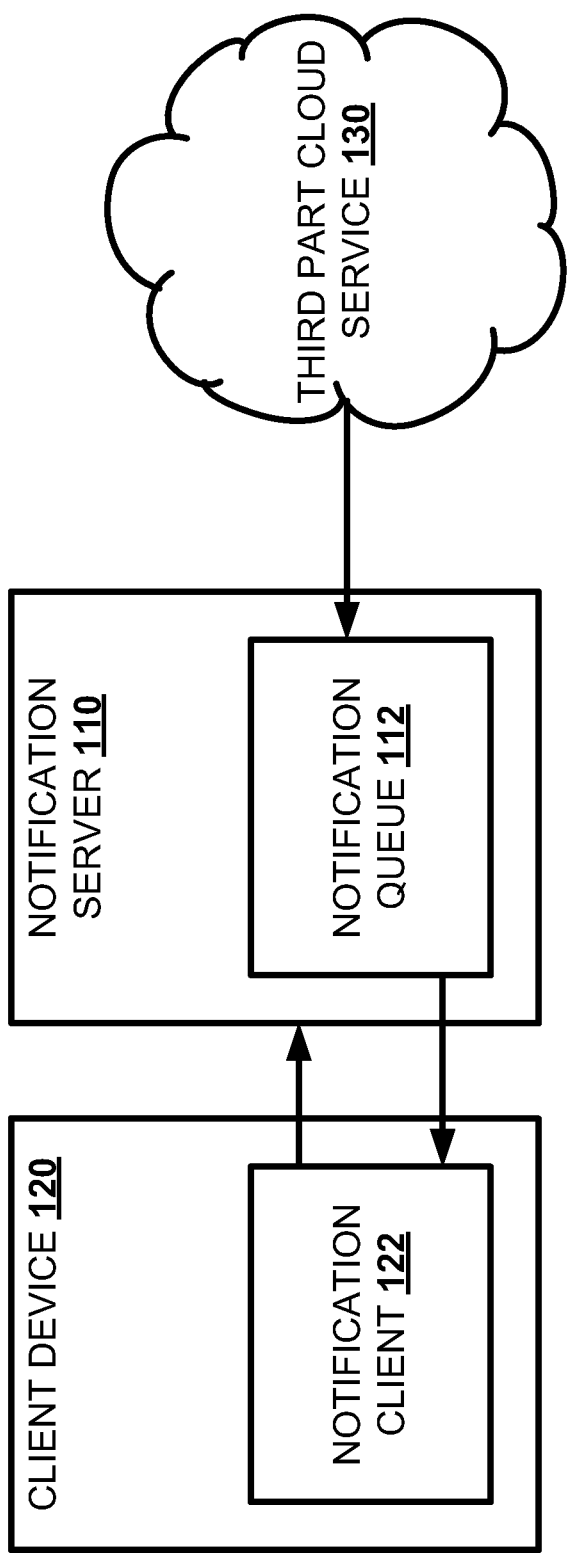
FIG. 1 illustrates, in a block diagram, one embodiment of a notification network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a notification server.

A push notification may be a sporadic asynchronous message. The notification server may send a push notification at any time and at any rate to a client device. Such activity may prevent the communication interface and processor of the client device from remaining in a lowest power state for extended periods of time. The constant and sporadic transition between the power states may result in draining the battery.

These power concerns may be ameliorated by allowing the client device to direct the notification server in creating a batch notification schedule by selecting a power consumption profile from a range of power consumption profile candidates. The client device may tailor the batch notification schedule to the actual power consumption profile of the client device, rather than making a binary choice between "idle" and "active". The client device may indicate to the notification server the power consumption profile being enabled. Further, the notification server may determine a priority level rating for notifications for the client device based on the power consumption profile. The priority rating level is the metric used by the notification server for determining the priority of a notification.

The notification server may adjust the delivery of notifications by temporarily storing and forwarding notifications in a fixed batch interval optimized for the power consumption profile. The client device protocol and notification server protocol may support an enumeration of power consumption profiles, with a number indicating which power consumption profile describes the client device. The power consumption profile may describe the client device as "idle", "sleep", "connected standby", "roaming", "plugged in" and others. Further power consumption profiles may be developed and added, with the system being easily extensible to further power states. The client device may choose the notification delivery semantics for the service. The client device may identify the power consumption profiles by the enumeration, with each option resulting in a different notification delivery behavior. The notification server may disperse a notification batch early if a priority notification is received or if the notification queue at the notification server is full or reaches a queue threshold.

The client device may apply one or more power consumption heuristics to select a power consumption profile. The power consumption heuristics may be the state of the display screen, the login status, the network connection type, the data usage preference, the current battery life, the hardware spec, the operating system version, the form factor of the device, or other device descriptions. The power consumption heuristics may be generic as provided by the operating system or customized to the device. In an enterprise scenario, corporate policy may shape the power consumption heuristics.

Additionally, the client device may provide the user with a menu of options for notification delivery schemes. Based on the power consumption profile, the notification server may change the duration during which the notifications are delivered or batched, the types of notifications being delivered, the notification prioritization, or other scheme features.

The notification server may follow a number of different notification batch schedules each corresponding to a different power consumption profile. For example, the notification batch schedule may deliver the notifications upon arrival to an "active" client device. For other states, the notification server may batch low priority notifications for 7.5 minutes, while delivering high priority notification upon arrival. Alternately, the notification server may batch low priority notifications for 10 minutes, while delivering high priority notification upon arrival. For a client device in an idle state, the notification server may store the notifications using a replacement policy until the client device exits the idle state. Alternately, the notification server may drop low priority notifications while delivering high priority notifications. The notification batch schedule may be optimized to extend client device battery life and improve performance.

Thus, in one embodiment, a notification server may batch together notifications to reduce power consumption. A notification server may receive a power consumption profile from a client device. The notification server may assign a notification batch schedule at a notification server based on the power consumption profile.

FIG. 1 illustrates, in a block diagram, one embodiment of a notification network 100. A notification server 110 may load a series of one or more notifications into a notification queue 112. The notification queue 112 may store the notifications until a triggering event occurs causing the notifications to be released as a notification batch to a client device 120. The triggering event for a batch dispersal may be finishing a batch interval, reaching a queue threshold, or receiving a high priority notification.

The client device 120 may have a resident notification client 122 to receive and process the notification batch. The client device 120 may determine a power consumption context of the client device 120 to calculate a power consumption profile. The power consumption context describes the current power usage of the client device. The client device 120 may send a profile protocol command to the notification server 110 indicating the power consumption profile. The power consumption profile may be dynamic, meaning that the type of power usage changes over time and as the client device 120 loses stored power. The notification server 110 may use that power consumption profile to determine a batch interval for a notification batch schedule. The client device 120 may be a laptop client device or a tablet device. The notification server 110 may receive the notifications from a third part cloud service 130, such as an e-mail service, a text service, a software support service, or other services.

Figure 2:
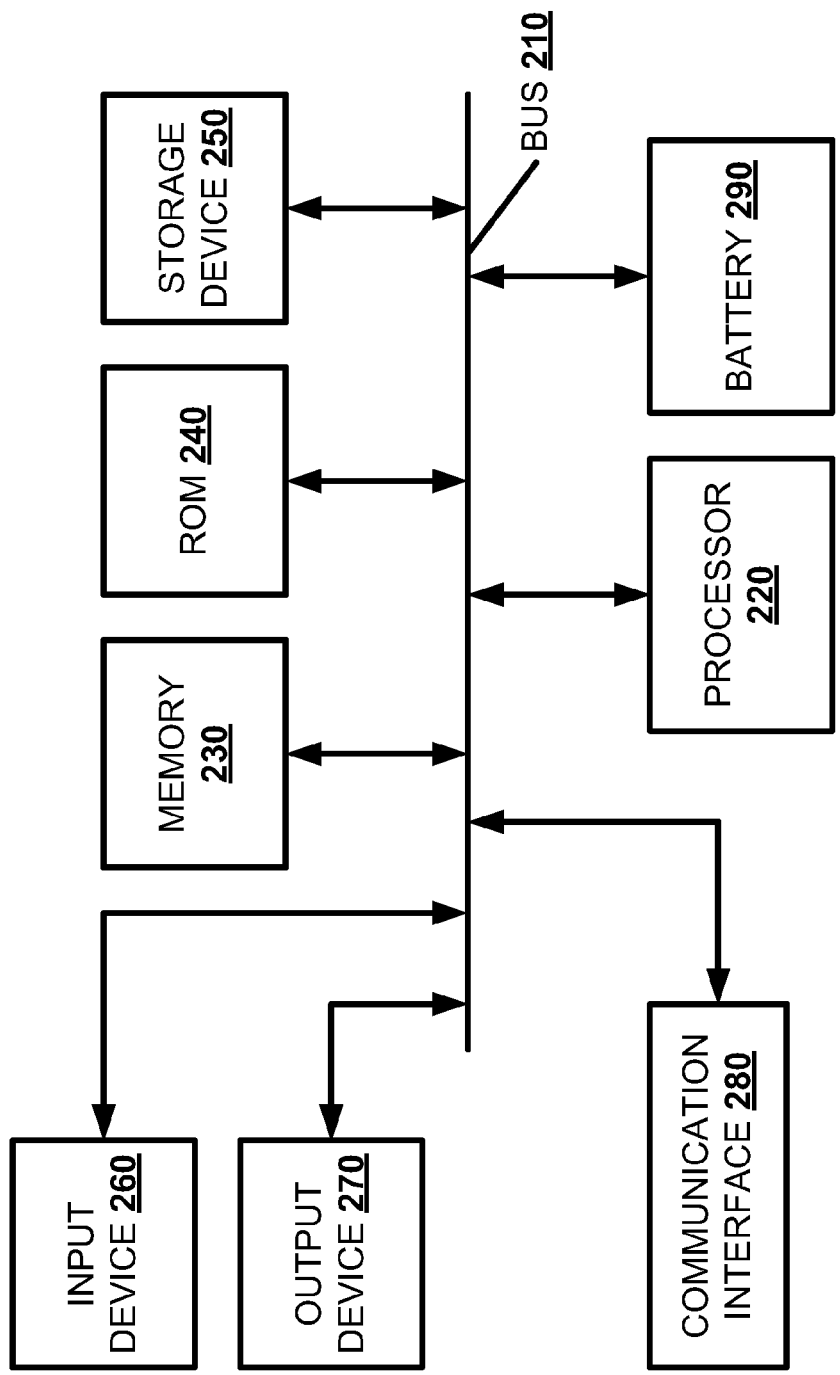
FIG. 2 illustrates, in a block diagram, one embodiment of a computing device.

FIG. 2 illustrates a block diagram of an exemplary computing device 200 which may act as a notification server 110 or a client device 120. The computing device 200 may combine one or more of hardware, software, firmware, and system-on-a-chip technology to implement a notification server 110 or a client device 120. The computing device 200 may include a bus 210, a processor 220, a memory 230, a read only memory (ROM) 240, a storage device 250, an input device 260, an output device 270, a communication interface 280, and a battery 290. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. The storage device 250 may store a set of instructions detailing a method that when executed by one or more processors cause the one or more processors to perform the method. The storage device 250 may also be a database or a database interface for storing the tracking infrastructure data, such as the asset management database.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables computing device 200 to communicate with other devices or networks. The communication interface 280 may include a network interface or a mobile transceiver interface. The communication interface 280 may be a wireless, wired, or optical interface The computing device 200 may have a battery 290 or other portable power source that may increase the mobility of the computing device 200. The battery 290 may implement a power consumption profile by instituting any number of power use strategies. The computing device 200 may use the battery 290 as a power source or be plugged in to a less limited power source, such as a power grid, with minimal change to the user experience.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

FIG. 3 illustrates, in a block diagram, one embodiment of a notification 300. The notification 300 may have a device identifier (ID) 310 indicating the client device 120, or possibly the user, to which the notification 300 is being sent. The notification 300 may have an application identifier 320 indicating the specific client application 122 on the client device 120 that is to receive the notification 300. The notification 300 may have a message 330 containing the relevant data of the notification 300. The message 330 may be an e-mail, an instant message, or other message to the user of the client device 120. Alternatively, the message 330 may be a security patch, a feature upgrade, or other piece of software used to improve the client application 122. The notification 300 may have a priority flag 340 indicating the priority level of the notification 300. A high priority notification 300 may cause the notification batch to be dispersed prior to the expiration of the batch interval.

FIG. 4 illustrates, in a block diagram, one embodiment of a profile protocol command 400. The profile protocol command 400 may have a server identifier 410 to identify the notification server 110 that the profile protocol command is targeting. The profile protocol command 400 may have a device identifier (ID) 420 indicating the client device 120 sending the profile protocol command 400. The profile protocol command 400 may have a power consumption profile 430 describing the current and projected power usage of the client device 120. The power consumption profile 430 may describe the mode that the client device 120, such as a screen off mode or a connected standby mode. Alternately, the power consumption profile 430 may describe the number of devices being used, the number of applications using those devices, the power usage by those devices or applications, the projected duration of that usage, and whether that usage is projected to be recurring. The details of the power consumption profile 430 may be kept sufficiently vague to protect user privacy.

Figure 5:
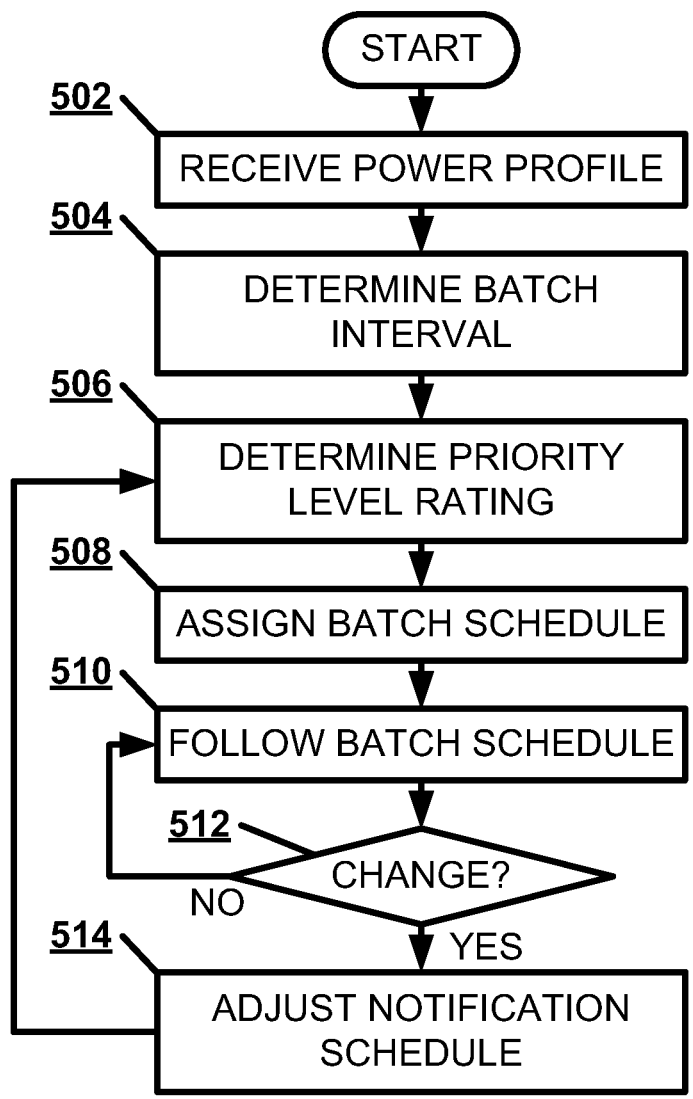
FIG. 5 illustrates, in a flowchart, one embodiment of a method of determining a batch notification schedule at the notification server.

FIG. 5 illustrates, in a flowchart, one embodiment of a method 500 of determining a batch notification schedule at the notification server 110. The notification server 110 may receive a profile protocol command 400 containing a power consumption profile from a client device 120 (Block 502). The notification server 110 may determine a batch interval based on the power consumption profile 430 (Block 504). The notification server 110 may determine a priority level rating for a notification based on the power consumption profile (Block 506). The notification server 110 may assign a notification batch schedule based on the power consumption profile (Block 508). The notification server 110 may follow the notification batch schedule in processing notifications (Block 510). If the notification server 110 receives a profile protocol command indicating a power consumption profile 430 change of the client device 120 (Block 512), the notification server 110 may adjust the notification batch schedule based on the power consumption profile 430 change (Block 514).

Figure 6:
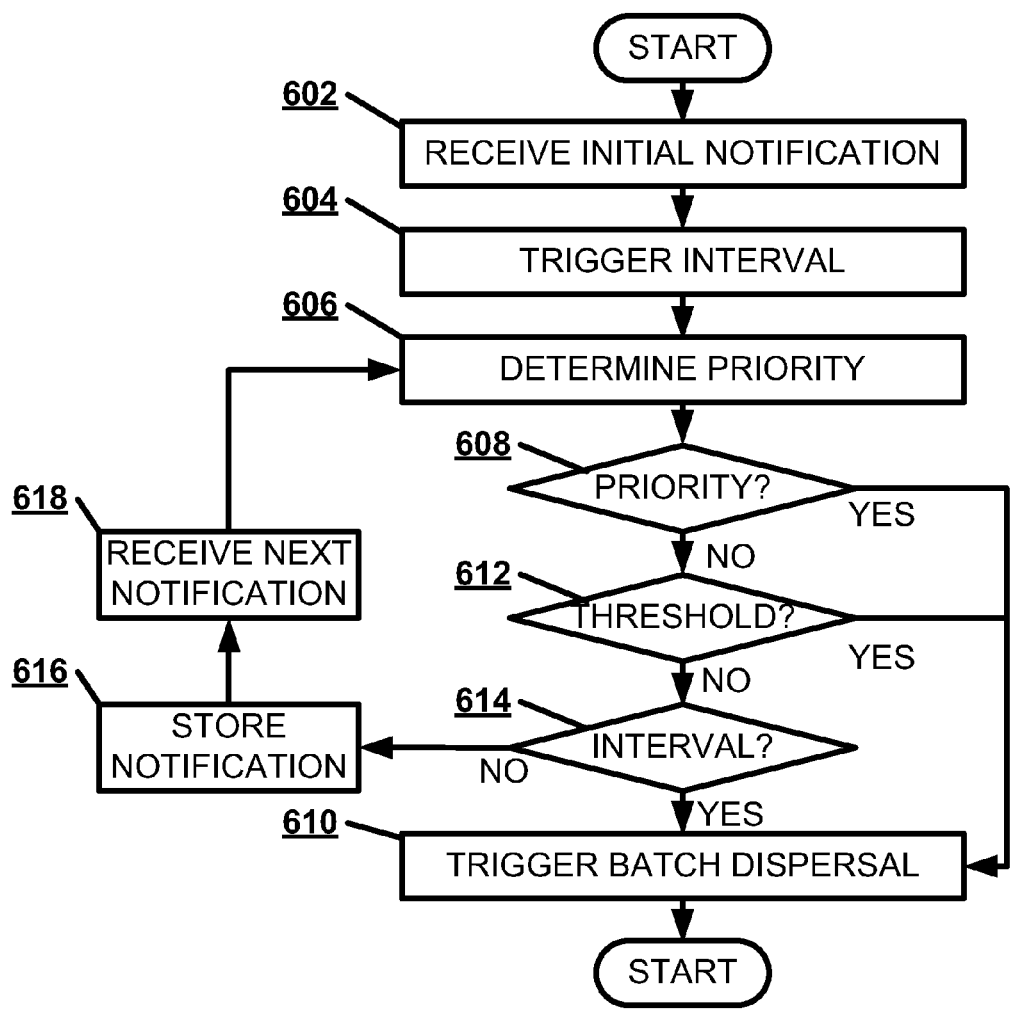
FIG. 6 illustrates, in a flowchart, one embodiment of a method of processing notifications at the notification server with a batch notification schedule.

FIG. 6 illustrates, in a flowchart, one embodiment of a method 600 of processing notifications at the notification server with a batch notification schedule. The notification server 110 may receive an initial notification from the client device 120 (Block 602). The notification server 110 may trigger the batch interval upon receiving the initial notification in the notification queue 112 (Block 604). The notification server 110 may determine a priority level for a notification based on the power consumption profile (Block 606). If the notification queue 112 received a high priority notification (Block 608), the notification server 110 may trigger a batch dispersal (Block 610). If the notification queue 112 reaches a queue threshold (Block 612), the notification server 110 may trigger a batch dispersal (Block 610). If the batch interval has expired (Block 614), the notification server 110 may trigger a batch dispersal according to the notification batch schedule (Block 610). Otherwise, the notification server 110 may store the notification in a notification queue 112 (Block 616). The notification server 110 may then receive the next notification (Block 618).

Figure 7:
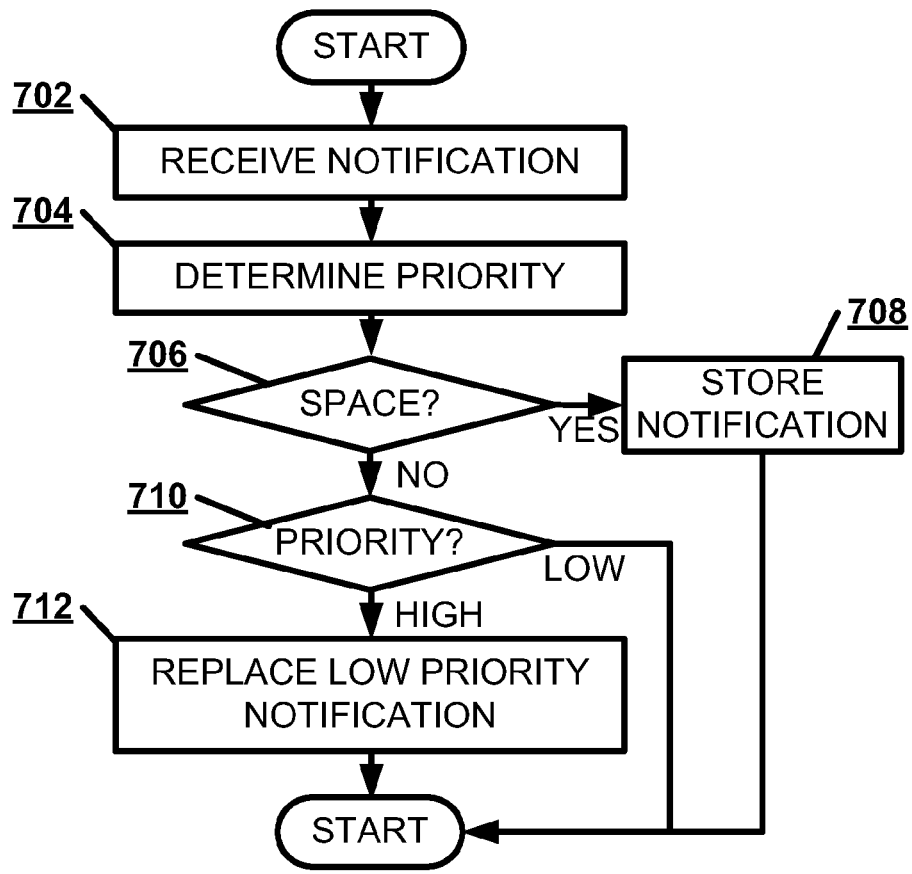
FIG. 7 illustrates, in a flowchart, one embodiment of a method of following a batch notification schedule for an idle state.

A batch notification schedule may describe managing those notifications being batched by selectively storing the notifications. For example, a batch notification schedule may discard certain notifications when the power consumption profile indicates an idle state. FIG. 7 illustrates, in a flowchart, one embodiment of a method 700 of following a batch notification schedule for an idle state. The notification server 110 may receive a notification from the client device 120 (Block 702). The notification server 110 may determine a priority level for the notification based on the idle power consumption profile (Block 704). If the notification queue 112 has available space (Block 706), the notification server 110 may store a notification in a notification queue 112 according to an idle batch notification schedule until a power consumption profile change (Block 708). If the notification queue 112 is full (Block 708), and the notification server 110 has received a high priority notification (Block 710), the notification server 110 may replace a lower priority notification in the notification queue with high priority notification (Block 712). If the notification server 110 has received a low priority notification (Block 710), the notification may be discarded. Other power consumption profiles besides "idle" may have further actions described in a batch notification schedule.

Figure 8:
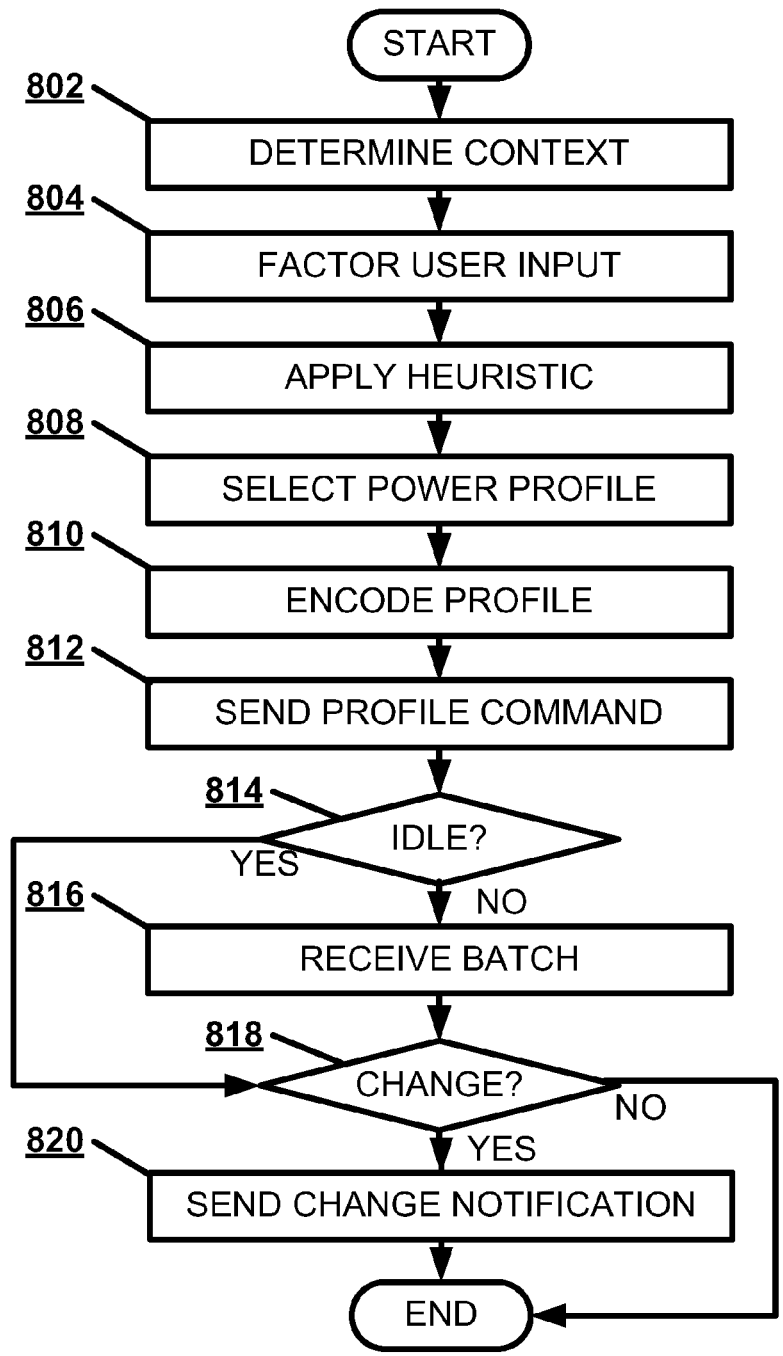
FIG. 8 illustrates, in a flowchart, one embodiment of a method of receiving a batch notification at the client device.

FIG. 8 illustrates, in a flowchart, one embodiment of a method 800 of receiving a batch notification at the client device 120. The client device 120 may determine a power consumption context (Block 802). The client device 120 may factor a user input into the power consumption context (Block 804). The user input may indicate planned future power usage by the user. The client device 120 may apply one or more power consumption heuristics to a power consumption context (Block 806). The client device 120 may select a power consumption profile from a range of power consumption profile candidates based on the power consumption heuristics (Block 808). The client device 120 may encode the power consumption profile into a profile protocol command 400 (Block 810). The client device 120 may send the profile protocol command 400 to the notification server 110 (Block 812). If the client device 120 is not in an idle state (Block 814), the client device 120 may receive a notification batch from a notification server 110 following a notification batch schedule based on the power consumption profile 430 (Block 816). If the client device 120 detects a power consumption profile change (Block 818), the client device 120 may send a profile protocol command indicating the power consumption profile change (Block 820).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
receiving a power consumption profile from a client device; and
assigning a notification batch schedule at a notification server based on the power consumption profile.

2. The method of claim 1, further comprising:
triggering a batch dispersal to the client device according to the notification batch schedule.

3. The method of claim 1, further comprising:
determining a batch interval based on the power consumption profile.

4. The method of claim 3, further comprising:
triggering the batch interval upon receiving an initial notification in a notification queue.

5. The method of claim 1, further comprising:
determining a priority level rating for a notification based on the power consumption profile.

6. The method of claim 1, further comprising:
triggering a batch dispersal upon receiving a high priority notification.

7. The method of claim 1, further comprising:
triggering a batch dispersal upon reaching a queue threshold for a notification queue.

8. The method of claim 1, further comprising:
receiving a profile protocol command indicating a power consumption profile change of the client device.

9. The method of claim 8, further comprising:
adjusting the notification batch schedule based on the power consumption profile change.

10. The method of claim 1, further comprising:
storing a notification in a notification queue at the notification server according to an idle batch notification schedule until a power consumption profile change.

11. The method of claim 1, further comprising:
receiving a high priority notification at the notification server; and
replacing a lower priority notification in a notification queue with the high priority notification.

12. A tangible machine-readable medium having a set of instructions detailing a method stored thereon that when executed by one or more processors cause the one or more processors to perform the method, the method comprising:
selecting a power consumption profile from a range of power consumption profile candidates at a client device; and
receiving a notification batch in the client device from a notification server following a notification batch schedule based on the power consumption profile.

13. The tangible machine-readable medium of claim 12, wherein the method further comprises:
sending a profile protocol command to the notification server.

14. The tangible machine-readable medium of claim 12, wherein the method further comprises:
applying a power consumption heuristic to a power consumption context.

15. The tangible machine-readable medium of claim 12, wherein the method further comprises:
factoring a user input into a power consumption context of the client device.

16. The tangible machine-readable medium of claim 12, wherein the method further comprises:
detecting a power consumption profile change of the client device.

17. The tangible machine-readable medium of claim 16, wherein the method further comprises:
sending a profile protocol command indicating the power consumption profile change.

18. A notification server, comprising:
a communication interface that receives a power consumption profile selected from a range of power consumption profile candidates by a client device and transmits a notification batch to the client device according to a notification batch schedule, and
a processor that assigns the notification batch schedule based on the power consumption profile.

19. The notification server of claim 18, wherein a batch dispersal is triggered by reaching a queue threshold.

20. The notification server of claim 18, wherein a batch dispersal is triggered by receiving a high priority notification.

* * * * *